United States Patent
Sun et al.

(10) Patent No.: US 10,140,719 B2
(45) Date of Patent: Nov. 27, 2018

(54) SYSTEM AND METHOD FOR ENHANCING TARGET TRACKING VIA DETECTOR AND TRACKER FUSION FOR UNMANNED AERIAL VEHICLES

(71) Applicant: TCL RESEARCH AMERICA INC., San Jose, CA (US)

(72) Inventors: Xinyao Sun, San Jose, CA (US); Xinpeng Liao, San Jose, CA (US); Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 104 days.

(21) Appl. No.: 15/387,846

(22) Filed: Dec. 22, 2016

(65) Prior Publication Data

US 2018/0182109 A1    Jun. 28, 2018

(51) Int. Cl.
| | |
|---|---|
| *G06T 7/246* | (2017.01) |
| *G06T 7/73* | (2017.01) |
| *G06K 9/32* | (2006.01) |
| *G06K 9/46* | (2006.01) |
| *G06N 3/04* | (2006.01) |
| *G06K 9/00* | (2006.01) |

(52) U.S. Cl.
CPC .......... *G06T 7/246* (2017.01); *G06K 9/00624* (2013.01); *G06K 9/3233* (2013.01); *G06K 9/4642* (2013.01); *G06N 3/04* (2013.01); *G06T 7/73* (2017.01); *G06T 2207/10032* (2013.01); *G06T 2207/20076* (2013.01); *G06T 2207/20081* (2013.01); *G06T 2207/20084* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

2017/0193669 A1*   7/2017   Poddar .................. G06T 7/2033

OTHER PUBLICATIONS

Siam, Mennatullah, and Mohamed ElHelw. "Robust autonomous visual detection and tracking of moving targets in UAV imagery." Signal Processing (ICSP), 2012 IEEE 11th International Conference on. vol. 2. IEEE, 2012.*
Hua, Yang, Karteek Alahari, and Cordelia Schmid. "Occlusion and motion reasoning for long-term tracking." European Conference on Computer Vision. Springer, Cham, 2014.*

(Continued)

*Primary Examiner* — Vu Le
*Assistant Examiner* — Tracy Mangialaschi
(74) *Attorney, Agent, or Firm* — Anova Law Group, PLLC

(57) ABSTRACT

A system and a method for enhancing target tracking via detector and tracker fusion for unmanned aerial vehicles (UAVs) are provided. The method comprises receiving at least one raw input image of objects to be detected; based on the at least one raw input image of objects, generating the objects' candidate information; based on the objects' candidate information, calculating location and velocity estimation of an object at a current timestamp based on a detector and tracker fusion; and based on the location and velocity estimation of the object at the current timestamp, predicting the location and velocity estimation of the object at a future timestamp.

18 Claims, 5 Drawing Sheets

(56) References Cited

OTHER PUBLICATIONS

Ma, Chao, et al. "Long-term correlation tracking." Computer Vision and Pattern Recognition (CVPR), 2015 IEEE Conference on. IEEE, 2015.*
Denil, Misha, et al. "Learning where to Attend with Deep Architectures for Image Tracking." arXiv preprint arXiv:1109.3737 (2011).*
Seguin G, Bojanowski P, Lajugie R, Laptev I. Instance-Level Video Segmentation from Object Tracks. InComputer Vision and Pattern Recognition (CVPR), 2016 IEEE Conference on Jun. 27, 2016 (pp. 3678-3687). IEEE.*
Cheng XE, Wang SH, Chen YQ. Learning kinematic model of targets in videos from fixed cameras. InMultimedia and Expo (ICME), 2016 IEEE International Conference on Jul. 11, 2016 (pp. 1-6). IEEE.*

\* cited by examiner

SYSTEM AND METHOD FOR ENHANCING TARGET TRACKING VIA DETECTOR AND TRACKER FUSION FOR UNMANNED AERIAL VEHICLES

FIELD OF THE INVENTION

The present invention relates generally to the field of computer technologies and, more particularly, to a system and a method for enhancing target tracking via detector and tracker fusion for unmanned aerial vehicles (UAVs).

BACKGROUND

Unmanned Aerial Vehicles (UAV) have great potential to be widely used in both research and commercial applications, which often requires a target object tracking, such as motion-based recognition for human identification, automated surveillance for detecting suspicious activities, and human-robot interaction for hands and face tracking, etc. The target object tracking may be defined as a problem of estimating the trajectory of the object in the image plane as it moves around in a scene. Meanwhile, a tracker is highly desired to assign a consistent label to the tracked object over time in a sequence of video frames, and provide the object's centric information depending on different tracking domains.

Two subtasks are often proposed under the target object tracking task: building a model of the interested target and predicating the target's information at the current frame based on the target's information in the previous frames. These two subtasks are repeatedly performed to keep updating the model of the interested target. However, various factors may cause the tracking task on the UAV installed with a single-lens camera to be very challenging, such as loss of information caused by the projection of 3D real world to 2D image frames, noise in images, partial and full object occlusions, real-time processing requirements, and abrupt changes of the scene caused by the UAV's movement, etc.

Conventional tracking techniques work with imposed constraints, and the corresponding algorithms mainly fall within two main domains: Tracking-by-Detection and Filtering-based Visual Object Tracking. However, these techniques have their own limitations under different environments. For example, robust tracking is a critical component for an advanced UAV to interact with the real dynamic word in a natural way, which brings additional challenges to the conventional tracking techniques.

The disclosed system and method are directed to solve one or more problems set forth above and other problems.

BRIEF SUMMARY OF THE DISCLOSURE

One aspect of the present disclosure provides a method for enhancing target tracking via detector and tracker fusion for UAVs. The method comprises receiving at least one raw input image of objects to be detected; based on the at least one raw input image of objects, generating the objects' candidate information; based on the objects' candidate information, calculating location and velocity estimation of an object at a current timestamp based on a detector and tracker fusion; and based on the location and velocity estimation of the object at the current timestamp, predicting the location and velocity estimation of the object at a future timestamp.

Another aspect of the present disclosure a non-transitory computer-readable medium having computer program for, when being executed by a processor, performing method for enhancing target tracking via detector and tracker fusion for UAVs, the method comprises receiving at least one raw input image of objects to be detected; based on the at least one raw input image of objects, generating the objects' candidate information; based on the objects' candidate information, calculating location and velocity estimation of an object at a current timestamp based on a detector and tracker fusion; and based on the location and velocity estimation of the object at the current timestamp, predicting the location and velocity estimation of the object at a future timestamp.

Another aspect of the present disclosure includes a system for enhancing target tracking via detector and tracker fusion for UAVs. The system comprises a detector and tracker module and a detector and tracker fusion (D&TF) module. The detector and tracker module is configured to receive a raw input image of objects and generate the objects' candidate information. The detector and tracker fusion (D&TF) module is configured to, generate the objects' candidate information based on the at least one raw input image of objects, calculate location and velocity estimation of an object at a current timestamp based on a detector and tracker fusion based on the objects' candidate information, and predict the location and velocity estimation of the object at a future timestamp based on the location and velocity estimation of the object at the current timestamp.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope, of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a system and a method for enhancing target tracking via detector and tracker fusion for UAVs, which may include detector and tracker fusion (D&TF) processing and feature encoding and attention mechanism processing. The detector and tracker fusion (D&TF) processing may be configured to fuse classical and novel vision-based detectors', and trackers' results, and then generate a robust target prediction by overcoming the traditional tracking technique's limitation in the scenes of UAV related tracking tasks with unconstrained environment and high acceleration & large rotations.

The D&TF processing may be considered as an anonymous tracking policy which adopts the information generated by other normal trackers and detectors as the input. Such an end to end framework may allow the module to be used for tracking different interested targets and, thus, may be embedded into the existing UAV's framework to enhance its tracking performance and its adaptability to more applications. Further, the feature encoding and attention mechanism processing, which translate vision-based information to a feature space, may reduce the cost of computation, the power consumption of the UAV, and increase the flying time of UAV.

Figure 1:
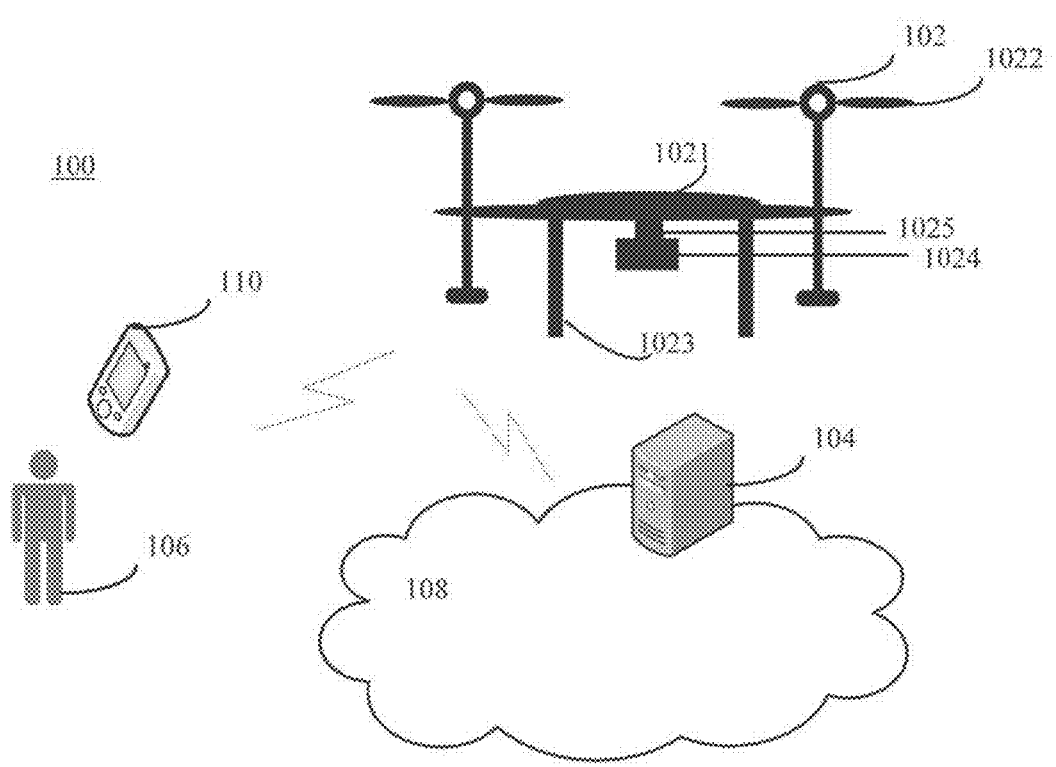
FIG. 1 illustrates an exemplary environment incorporating certain embodiments of the present invention.

FIG. 1 illustrates an exemplary environment 100 incorporating certain embodiments of the present invention. As shown in FIG. 1, the environment 100 may include a mobile platform 102, a server 104, a user 106, and a network 108. Other devices may also be included. The mobile platform 102 may include any appropriate mobile platforms, such as bicycles, automobiles, trucks, ships, boats, trains, helicopters, aircraft, and various hybrids thereof, etc.

The mobile platform 102 may respond to commands from the user 106, through the network 108. The user 106 may use a remote controller 110 to control the mobile platform 102. The remote controller 110 may be not connected to the mobile platform 102 and may communicate with the mobile platform 102 wirelessly from a distance. The mobile platform 102 may be capable of following a set of predetermined instructions. In certain embodiments, the mobile platform 102 may operate semi-autonomously by responding to one or more commands from the user 106 while otherwise operating autonomously.

In one embodiment, the mobile platform 102 may be a unmanned aerial vehicle (UAV) 102. Various types of UAVs 102 may be suitable for use with the disclosed systems and methods. For example, the UAV 102 may be an aerial rotorcraft that is propelled by multiple rotors. As shown in FIG. 1, the UAV 102 may comprise a fuselage 1021, a plurality of rotors 1022, and one or more landing gears 1023. Other appropriate components may also be included.

The fuselage 1021 may comprise a control unit, an inertial measuring unit (IMU), processor, battery, power source, and/or other sensors. The rotors 1022 may connect to the fuselage 1021 via one or more arms or extensions that may branch from edges or a central portion of the fuselage 1021, and the one or more arms may have rotors 1022 at or near the ends of the arms. The rotors 1022 may be capable of rotating to generate lift for the UAV 102, and may be propulsion units that may enable the UAV 102 to move about freely through the air. The landing gears 1023 may support the weight of the UAV 102, and provide rolling chassis/taxiing and shock absorption function.

Further, one or more object detectors 1024 may be mounted on the UAV 102. The object detector 1024 may be an object detector based on various mechanism, such as ultrasound detector, radar, single lens camera, and multiple lens camera, etc. The object detectors 1024 may be directly mounted on the fuselage 1021 of the UAV 102. In certain embodiments, the UAV 102 may also include a gimbal mechanism 1025 disposed on a surface of the fuselage 1021 of the UAV 102. The object detector 1024 may be attached to the gimbal mechanism 1025, providing the object detector 1024 rotational freedom about one or more axes with respect to the fuselage 1021.

The server 104 may include any appropriate type of server computer or a plurality of server computers for providing personalized contents to the user 106. For example, the server 104 may be a cloud computing server. The server 104 may also facilitate the communication, data storage, and data processing between the other servers and the mobile platform 102. The mobile platform 102, and server 104 may communicate with each other through one or more communication networks 108, such as cable network, wireless network, and/or satellite network, etc.

Figure 2:
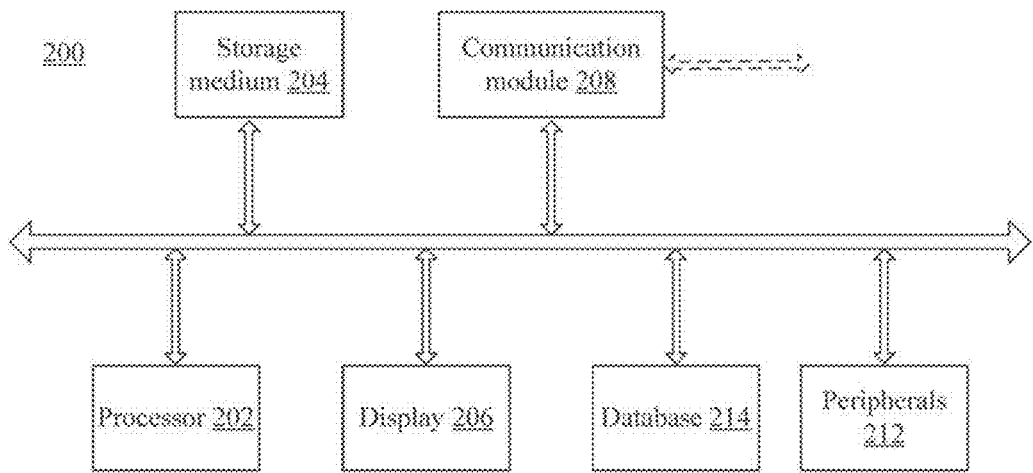
FIG. 2 illustrates an exemplary computing system consistent with disclosed embodiments.

The mobile platform 102, and/or server 104 may be implemented on any appropriate computing circuitry platform. FIG. 2 shows a block diagram of an exemplary computing system capable of implementing the mobile platform 102, and/or server 104.

As shown in FIG. 2, the computing system 200 may include a processor 202, a storage medium 204, a display 206, a communication module 208, a database 214, and peripherals 212. Certain components may be omitted and other components may be included.

The processor 202 may include any appropriate processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by the processor 202.

Further, the peripherals 212 may include various sensors and other I/O devices, such as keyboard and mouse, and the communication module 208 may include certain network interface devices for establishing connections through communication networks. The database 214 may include one or more databases for storing certain data and for performing certain operations on the stored data, such as database searching.

Figure 3:
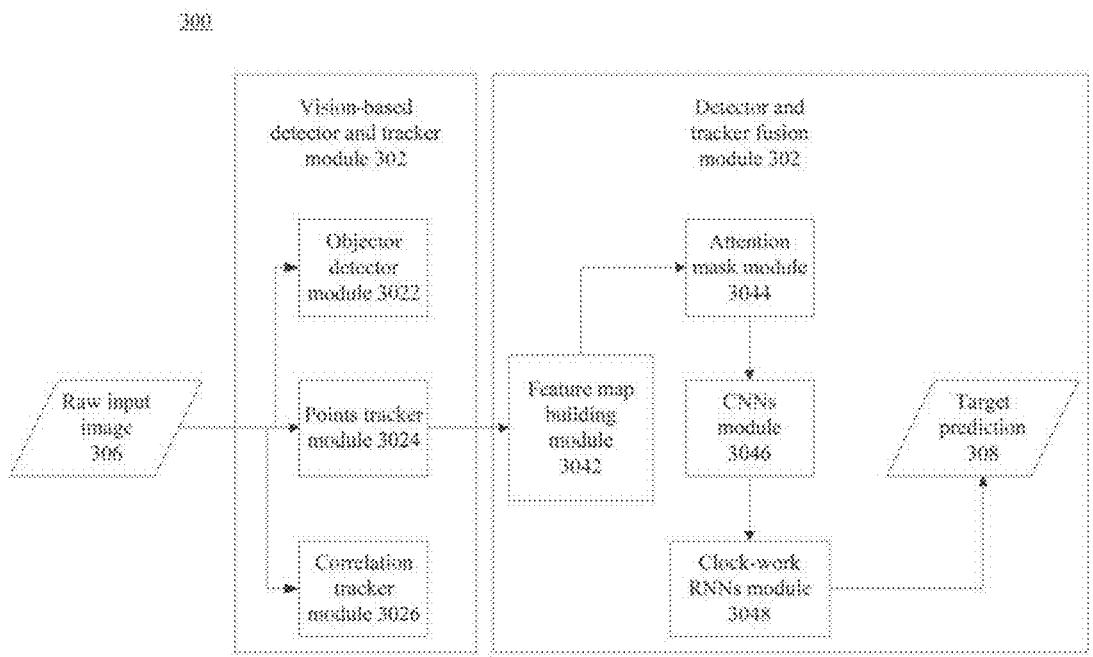
FIG. 3 illustrates a block diagram of an exemplary system for enhancing target tracking via detector and tracker fusion for unmanned aerial vehicles (UAVs) consistent with disclosed embodiments.

Returning to FIG. 1, the mobile platform 102 may be implemented with a system for enhancing target tracking via detector and tracker fusion. FIG. 3 illustrates an exemplary system for enhancing target tracking via detector and tracker fusion for UAVs consistent with disclosed embodiments. As shown in FIG. 3, the system 300 for enhancing target tracking via detector and tracker fusion may include a detector and tracker module 302, and a detector and tracker fusion (D&TF) module 304.

The detector and tracker module 302 may be configured to receive a raw input image 306 of objects and generate the objects' candidate information. The detector and tracker module 302 may be configured to receive the raw input image 306 of the object by various approaches, such as ultrasound, vision-based, time-of-flight (TOF), and radar, etc. In one embodiment, the detector and tracker module 302 may be configured to receive the raw input image 306 of the object through a single lens camera mounted on the UAV. Accordingly, the detector and tracker module 302 may be a vision-based detector and tracker module, and the system for enhancing target tracking via detector and tracker fusion 300 may be configured to track the detected object robustly through the UAV's single lens camera.

In particular, the detector and tracker module 302 may further include an object detector module 3022, a points tracker module 3024, and a correlation tracker module 3026. The object detector module 3022 may be configured to detect the objects from the raw input image 306 of the objects, the points tracker module 3024 may be configured to track extracted feature points from a candidate object, and the correlation tracker module 3026 may be configured to track the candidate object based on correlation filters.

In one embodiment, the object detector module 3022 may be a pre-trained histogram-of-oriented-gradient (HOG) detector, which is able to detect semi-rigid objects in images. The output of the object detector module 302 may be a bounding box $bb^{(lx,ly,rx,ry)}$ corresponding to a detected object, at the current timestamp, and the bounding box information may include location of left upper corner (lx, ly,) and location of bottom-right corner (rx, ry,).

To obtain a candidate object's location information at each timestamp, the points tracker module 3024 may be configured to be a gradient based tracker using the Kanade-Lucas-Tomasi (KLT) approach. The points tracker module 3024 may be configured to generate the object's location information at each timestamp according to trackers feature points $P_{KLT} = \{p_1^{(x_1,y_1)}, p_2^{(x_2,y_2)}, \ldots p_n^{(x_n,y_n)}\}$.

The correlation tracker module 3026 may be a novel correlation tracker module under a tracking-by-detection framework. The correlation tracker module 3026 may be configured to track the candidate object according to learnt discriminative correlation filters on scaled pyramid representations for both translation and scale estimation. The correlation tracker module 3026 may be configured to follow whatever inside the initialized region at each further frame and output the bounding box $bb_{corr}$.

However, the object detector module 3022, the points tracker module 3024, and the correlation tracker module 3026 may have certain limitations. For example, the object detector module 3022 itself may have difficulties to detect to the object's out-of-plane orientation. The points tracker module 3024 (e.g., the KLT tracker) may not guarantee that the corresponding point in the next frame is a feature point, especially when the object has sudden movement, which may lose points and cause errors. The correlation tracker module 3026 may also have a similar issue which leads to the most severely drifting problem. Moreover, both the points tracker module 3024 and the correlation tracker module 3026 may be unable to handle occlusion easily, because the tracking model often considers only two consecutive frames.

The D&TF module 304 may be configured to remove one or more limitations set forth above and other limitations and, thus, track the moving candidate object. As shown in FIG. 3, the D&TF module 304 may further include a feature map building module 3042, an attention mask module 3044, a convolutional neural networks (CNNs) module 3046, and a clock-work recurrent neural networks (CW-RNNs) module 3048.

The feature map building module 3042 may be configured to generate a binary feature canvas. The feature canvas $c_t$ represents the vision information in the feature space at each timestamp t. The canvas may have a size (h, w) which is the same as the size of the raw frame image. The canvas may have three channels corresponding to the information of $\{bb, P_{KLT}, bb_{corr}\}$ with binary values using the one-hot encoding. When the channel represents the bounding box (bb, $bb_{corr}$), then a pixel inside the bounding box is set to be 1 and a pixel outside the bounding box to be 0, and when the channel represents the trackers feature points ($P_{KLT}$), then positions of the trackers feature points on the binary feature canvas is set to be 1 and positions of the trackers feature points beyond the binary feature canvas to be 0.

The attention mask module 3044 may be configured to further process the feature canvas based on an attention mechanism to focus on the relevant parts of the binary feature canvas $c_t$. In particular, the attention mask module 3044 may be configured to further process the feature canvas by ignoring other potentially distracting information that caused by the normal vision-based tracker's limitation. To further process the feature canvas based on the attention mechanism, a mixture of N×N Gaussians may be applied to the feature canvas $c_t$.

Based on each Gaussian (i, j) has the center at $$\left(\frac{rx_{t-1} + lx_{t-1}}{2} + vx_{t-1} + \left(i - \frac{N}{2} - 0.5\right),\right.$$
$$\left.\frac{ry_{t-1} + ly_{t-1}}{2} + vy_{t-1} + \left(i - \frac{N}{2}\right)\right),$$

the attention mask $M_t(e_{t-1})$ may be formed by the Gaussians and applied to each channel of the feature canvas $c_t$, respectively, where $$\sigma = \frac{S_{frame}}{S_{P_{t-1}}},$$

$S_{frame}$ denotes the area of the raw image, and $S_{P_{t-1}}$ denotes the area of the candidate object's estimated bounding box at the last frame. The attention mask $M_t(e_{t-1})$ may be calculated by Eq. (1)

$$m(c_t, e_{t-1}) = M_t(e_{t-1}) \cdot c_t, \quad (1)$$

and further sent to the CNNs module 3046.

The CNNs module 3046 may be configured to extract the feature from the feature space instead of the raw scene directly. CNNs has shown its adaptability on learning complex relationships within structured data due to their ability to learn hierarchies of abstract, localized representations the end-to-end manner. In the disclosed embodiments, the input of the CNNs module 3046 may be a 256×256×3 masked feature canvas in ($c_t$, $e_{t-1}$) at the timestamp t, and the architecture of the CNN is shown in Table 1:

TABLE 1

| Layer | Input | Filter size | Stride | Num filters | Activation | Output |
|---|---|---|---|---|---|---|
| Conv1 | 256 × 256 × 3 | 8 × 8 | 4 | 32 | LReLU | 63 × 63 × 32 |
| Conv2 | 63 × 63 × 32 | 7 × 7 | 2 | 64 | LReLU | 28 × 28 × 64 |
| Conv3 | 28 × 28 × 64 | 4 × 4 | 1 | 32 | LReLU | 13 × 13 × 32 |
| Conv4 | 13 × 13 × 32 | 1 × 1 | 1 | 1 | LReLU | 13 × 13 × 1 |
| Fc5 | 13 × 13 × 1 | | | 256 | LReLU | 256 |
| Fc6 | 256 | | | 128 | LReLU | 128 |

As shown in Table 1, in the disclosed embodiments, the CNN may include four convolutional layers and two fully connected layers, which are all followed by leaky rectified linear units (LReLUs). The output from the CNNs module 3046 may be an extracted feature vector $x_t$ with a length of 128 at the timestamp t, and the extracted feature vector $x_t$ may be fed into the clock-work recurrent neural networks (CW-RNNs) 3048.

The D&TF module 304 may be mainly configured to take the masked feature canvas $c_t$ as an input, and return the location and velocity estimation $e_t$ at the timestamp t. In mathematically representation, there is a probability sequence of estimations with the equivalent factorizes as Eq. (2):

$$P[(e_1,c_1),(e_2,c_2),(e_t,c_t)]=\Pi_{q=1}{}^t p(e_q|e_q,c_q) \qquad (2)$$

The probability model in Eq. (2) involves the history sequence of input, while the output contains highly relevant contextual information for the current timestamp's estimation. For the sequence learning prediction, Recurrent Neural Networks (RNNs) have shown the ability in theory to extract the temporal information which is, highly desired by the disclosed system.

Figure 4:
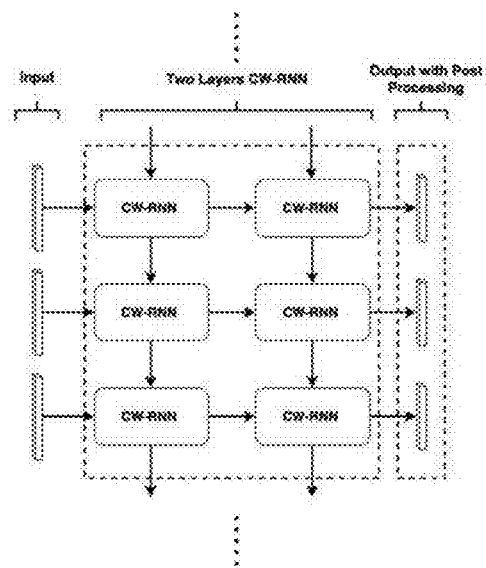
FIG. 4 illustrates an exemplary clock-work recurrent, neural network (CW-RNN) consistent with disclosed embodiments.
Figure 5:
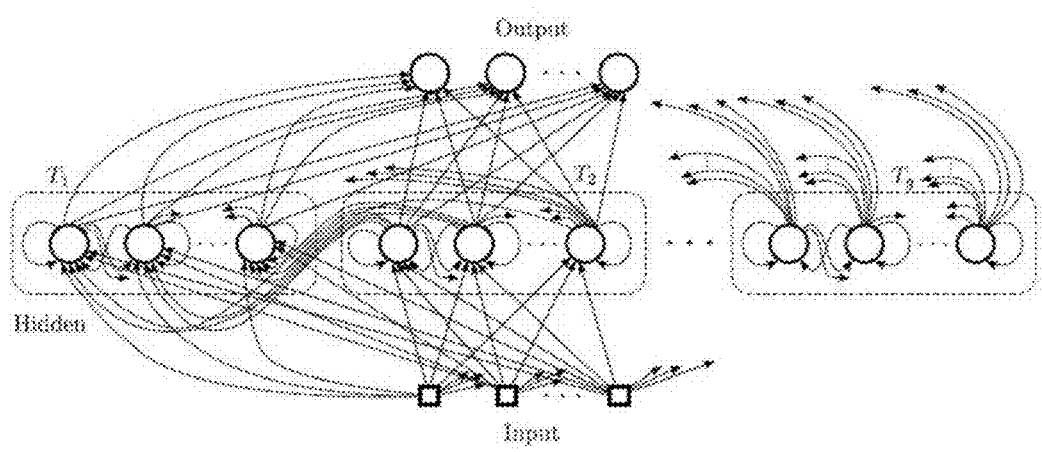
FIG. 5 illustrates an exemplary single CW-RNN unit consistent with disclosed embodiments.

The clock-work recurrent neural networks (CW-RNNs) module 3048 may adopt a novel clock-work RNN (CW-RNN) as the RNN unit under a many to many two-layers deep structure. FIG. 4 illustrates an exemplary clock-work recurrent neural network (CW-RNN) consistent with disclosed embodiments. FIG. 5 illustrates an exemplary single CW-RNN unit consistent with disclosed embodiments. As shown in FIG. 5, the hidden layer may include a set of separate processors $T=\{T_1, \ldots, T_g\}$, in which each processor may handle the inputs at its own temporal granularity as a clock rate. The neurons within each module may be fully interconnected, meanwhile the recurrent connections may be generated only between processors from slower modules to faster modules.

At the current timestamp t, the output $o_t$ of a single CW-RNN unit may be calculated by the following Eq. (3):

$$s_t=f_s(W_H s_{t-1}+W_{in}a_t)$$

$$o_t=f_o(W_{out}s_t), \qquad (3)$$

where $a_t$ denotes the input to the hidden part, as well as the previous layer's output ($a_t$ equals to the $x_t$ at first RNN layer), and $s_{t-1}$ denotes the output of hidden parts at the timestamp (t−1), and $f_s$ denotes the active function of hidden layer. LReLU may be adopted for the first RNN layer and Sigmoid may be adopted for last RNN layer. $W_H$ denotes the hidden processors interconnected matrix; $W_{in}$ denotes the weight matrix from input neurons to the hidden processors, and $W_{out}$ denotes the weight matrix from hidden processors to the output neurons.

Further, $W_H$ may be a block-upper triangular matrix where each entry $W_{j,i}$, i, j∈[1, ..., g] may be the connection weight matrix from $T_i$ to $T_j$ or 0 s if $T_i<T_j$. The clock-work RNN may work at each timestamp t, however, only the output of the modules (i.e., the slower modules and the faster modules) that satisfy (t MOD $T_i$)=0 may be executed. The disclosed framework may allow the low-clock-rate modules (i.e., the slower modules) to process retain and focus the long-term information within the input sequences and, meanwhile, allow the high-speed modules (i.e., the faster modules) to concentrate on the high-frequency information.

The final outputs $o_t$ is a vector ($slx_t$, $sly_t$, $srx_t$, $sry_t$, $svx_t$, $svy_t$), where each entry is the real number between 0 to 1, and the final result $e_t$ (i.e., the location and velocity estimation) at the current timestamp t may be calculated by the following Eq. (4):

$$e_t=(slx_t \times w_{frame}, sly_t \times h_{frame}, srx_t \times w_{frame}, sry_t \times h_{frame}, svx_t \times w_{frame}, svy_t \times h_{frame}) \qquad (4)$$

Based on the calculated location and velocity estimation $e_t$ at the current timestamp t, the target prediction 308 may be generated and outputted by the system 300. In particular, the target prediction 308 may include the location and velocity estimation of the candidate target in the next timestamp.

Figure 6:
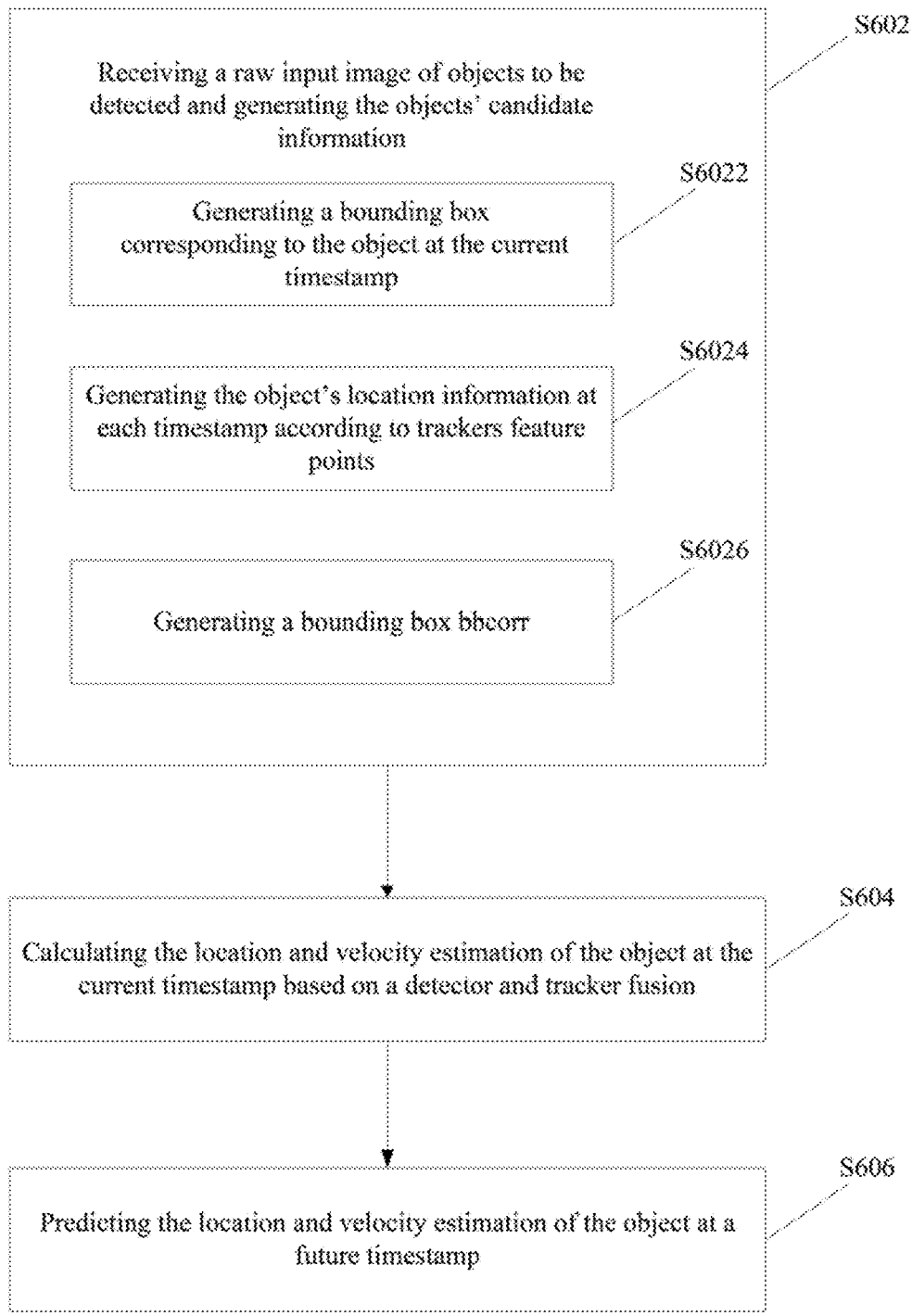
FIG. 6 illustrates a flow chart of an exemplary method for enhancing target tracking via detector and tracker fusion for UAVs consistent with disclosed embodiments.

The present disclosure also provides a method for enhancing target tracking via detector and tracker fusion for UAVs. FIG. 6 illustrates a flow chart of an exemplary method for enhancing target tracking via detector and tracker fusion for UAVs consistent with disclosed embodiments.

As shown in FIG. 6, at the beginning, a raw input image of objects is received and the objects' candidate information is generated (S602). The raw input image of objects to be detected may be received through various approaches, such as ultrasound, vision-based, time-of-flight (TOF), and radar, etc. In one embodiment, the raw input image of objects to be detected may be received through a single lens camera mounted on the UAV.

In particular, generating the objects' candidate information may further include the following steps which may be performed simultaneously or in a certain order:

S6022: based on a pre-trained histogram-of-oriented-gradient (HOG) algorithm, generating a bounding box $bb^{(lx,ly,rx,ry)}$ corresponding to the object at the current timestamp, wherein the bounding box information includes location of left upper corner (lx, ly,) and location of bottom-right corner (rx, ry,);

S6024: based on Kanade-Lucas-Tomasi (KLT) approach, generating the object's location information at each timestamp according to trackers feature points $P_{KLT}=\{p_1^{(x_1,y_1)}, p_2^{(x_2,y_2)}, \ldots p_n^{(x_n,y_n)}\}$; and S6026: based on the learnt discriminative correlation filters on scaled pyramid representations for both translation and scale estimation, generating the bounding box $bb_{corr}$.

Referring to FIG. 6, after the objects' candidate information is generated, the location and velocity estimation of the object at the current timestamp is calculated based on a detector and tracker fusion (S604).

Figure 7:
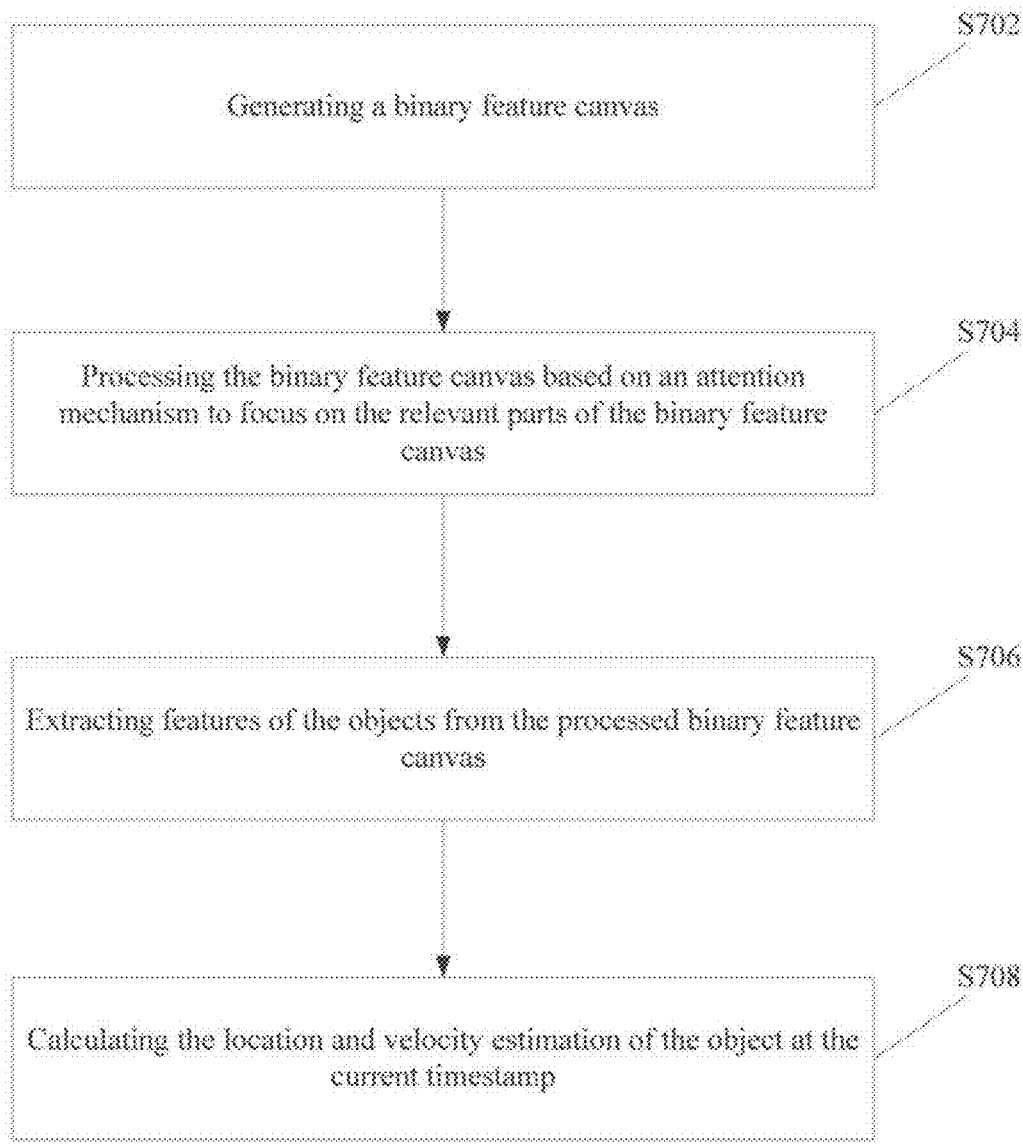
FIG. 7 illustrates a flow chart of an exemplary method for calculating location and velocity estimation of an object consistent with disclosed embodiments.

In particular, calculating the location and velocity estimation of the object may further include the following steps as shown in FIG. 7. FIG. 7 illustrates a flow chart of an exemplary method for calculating location and velocity estimation of an object consistent with disclosed embodiments.

As shown in FIG. 7, at the beginning, a binary feature canvas is generated (S702). In particular, the binary feature canvas $c_t$ represents the vision information in the feature space at each timestamp t. The canvas may have a size (h, w) which is the same as the size of the raw frame image. The canvas may have three channels corresponding to the information of $\{bb, P_{KLT}, bb_{corr}\}$ with binary values using the one-hot encoding. When the channel represents the bounding box (bb, $bb_{corr}$), then a pixel inside the bounding box is set to be 1 and a pixel outside the bounding box to be 0, and when the channel represents the trackers feature points ($P_{KLT}$), then positions of the trackers feature points on the binary feature canvas is set to be 1 and positions of the trackers feature points beyond the binary feature canvas to be 0.

Then the binary feature canvas is further processed based on an attention mechanism to focus on the relevant parts of the binary feature canvas $c_t$ (S704). In particular, an attention mask $M_t(e_{t-1})$ may be generated and applied to each channel of the feature canvas $c_t$, respectively, such that a masked feature canvas may be obtained. In one embodiment, the attention mask $M_t(e_{t-1})$ may be formed by a mixture of N×N Gaussians and applied to each channel of the feature canvas $c_t$, respectively, where each Gaussian (i, j) has the center at $$\left(\frac{rx_{t-1}+l_{t-1}}{2}+vx_{t-1}+\left(i-\frac{N}{2}-0.5\right),\right.$$
$$\left.\frac{ry_{t-1}+l_{t-1}}{2}+vy_{t-1}+\left(i-\frac{N}{2}\right)\right), \sigma=\frac{S_{frame}}{S_{Pt-1}},$$

$S_{frame}$ denotes the area of the raw image, and $S_{p_{t-1}}$ denotes the area of the candidate object's estimated bounding box at the last frame. The attention mask $M_t(e_{t-1})$ may be calculated by $m(c_t, e_{t-1})=M_t(e_{t-1})\cdot c_t$, and $m(c_t, e_{t-1})$ denotes the masked feature canvas.

Based on the masked feature canvas $m(c_t, e_{t-1})$, features of the objects are extracted from the feature space (S706). In particular, an extracted feature vector $x_t$ at the current timestamp t may be obtained based on convolutional neural networks (CNNs).

Based on the extracted feature vector $x_t$ at the current timestamp t, the location and velocity estimation of the object at the current timestamp t is calculated (S708). In particular, the location and velocity estimation of the object at the current timestamp t may be calculated based on clock-work recurrent neural networks (CW-RNNs) and a probability sequence of estimations with equivalent factorizes as $P[(e_1, c_1), (e_2, c_2), \ldots, (e_t, c_t)]=\Pi_{q=1}^{t}p(e_q|e_q, c_q)$. The location and velocity estimation $e_t$ at the current timestamp t may be calculated by $e_t=(slx_t \times w_{frame}, sly_t \times h_{frame}, srx_t \times w_{frame}, sry_t \times h_{frame}, svx_t \times w_{frame}, svy_t \times h_{frame})$. The details of calculating the location and velocity estimation of the object at the current timestamp t have been explained in the above-described system and, thus, are not repeated here.

Returning to FIG. 6, based on the location and velocity estimation of the object at the current timestamp t, the location and velocity estimation of the object at a future timestamp is predicted (S606).

The disclosed system and method for enhancing target tracking via detector and tracker fusion for UAV's may combine recent advances from classical and novel vision based face detection, and tracking techniques. In particular, the disclosed D&TF Processing may realize a transformation from vision space to feature space, and the D&TF module may be able to significantly improve the tracking quality by overcoming the existing tracking techniques' limitation such as drifting and occlusion issues. The disclosed system and method for enhancing target tracking via detector and tracker fusion for UAVs may be able to robustly estimate the movement of detected objects in front of the UAV's single lens camera in most dynamic environment.

Those of skill would further appreciate that the various illustrative modules and method steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the disclosed embodiments is provided to illustrate the present invention to those skilled in the art. Various modifications to these, embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for enhancing target tracking via detector and tracker fusion for Unmanned Aerial Vehicles (UAVs), comprising:
   receiving at least one raw input image of objects to be detected;
   based on the at least one raw input image of objects, generating the objects' candidate information;
   based on the objects' candidate information, calculating location and velocity estimation of an object at a current timestamp based on a detector and tracker fusion, comprising:
     generating a binary feature canvas;
     processing the binary feature canvas based on an attention mechanism to focus on relevant parts of the binary feature canvas;
     extracting features of the objects from the processed binary feature canvas; and
     calculating the location and velocity estimation of the object at the current timestamp;
   wherein processing the binary feature canvas based on the attention mechanism to focus on relevant parts of the binary feature canvas further including:
     generating an attention mask $M_t(e_{t-1})$ and applying the attention mask $M_t(e_{t-1})$ to each channel of the feature canvas $c_t$, respectively; and
     obtaining a masked feature canvas,
     wherein the attention mask $M_t(e_{t-1})$ is generated by a mixture of N×N Gaussians, each Gaussian (i,j) has a center at $$\left(\frac{rx_{t-1}+lx_{t-1}}{2}+vx_{t-1}+\left(i-\frac{N}{2}-0.5\right),\right.$$
$$\left.\frac{ry_{t-1}+ly_{t-1}}{2}+vy_{t-1}+\left(i-\frac{N}{2}\right)\right) \text{ and } \sigma=\frac{S_{frame}}{S_{Pt-1}},$$

where $S_{frame}$ denotes an area of the raw input image, and $S_{p_{t-1}}$ denotes an area of the object's estimated bounding box at a timestamp (t−1), and $m(c_t, e_{t-1})=M_t(e_{t-1})\cdot c_t$, where $m(c_t, e_{t-1})$ denotes the masked feature canvas; and
   based on the location and velocity estimation of the object at the current timestamp, predicting the location and velocity estimation of the object at a future timestamp.

2. The method for enhancing target tracking via detector and tracker fusion for UAVs according to claim 1, wherein receiving at least one raw input image of objects to be detected further including:
   receiving the raw input image of objects to be detected through a single lens camera mounted on the UAV.

3. The method for enhancing target tracking via detector and tracker fusion for UAVs according to claim 1, wherein based on the at least one raw input image of objects, generating the objects' candidate information further including:
   based on a pre-trained histogram-of-oriented-gradient (HOG) algorithm, generating a bounding box $bb^{(lx,ly,rx,ry)}$ corresponding to the object at the current timestamp, wherein the bounding box information includes location of left upper corner (lx,ly,) and location of bottom-right corner (rx,ry);

based on Kanade-Lucas-Tomasi (KLT) approach, generating the object's location information at each timestamp according to trackers feature points $P_{KLT}=\{p_1^{(x_1,y_1)}, p_2^{(x_2,y_2)} \ldots p_n^{(x_n,y_n)}\}$; and based on learnt discriminative correlation filters on scaled pyramid representations for both translation and scale estimation, generating a bounding box $bb_{corr}$.

4. The method for enhancing target tracking via detector and tracker fusion for UAVs according to claim 1, wherein:

the binary feature canvas is denoted by $c_t$, $c_t$ represents vision information in a feature space at a current timestamp t;

the binary feature canvas has a size (h, w) which is the same as a size of the raw input image; and the binary feature canvas has three channels corresponding to information of $\{bb, P_{KLT}, bb_{corr}\}$ with binary values using the one-hot encoding, wherein when the channel represents the bounding box (bb, $bb_{corr}$), then a pixel inside the bounding box is set to be 1 and a pixel outside the bounding box to be 0, and when the channel represents the trackers feature points ($P_{KLT}$), then positions of the trackers feature points on the binary feature canvas is set to be 1 and positions of the trackers feature points beyond the binary feature canvas to be 0.

5. The method for enhancing target tracking via detector and tracker fusion for UAVs according to claim 1, wherein extracting features of the objects from the processed binary feature canvas further including:

extracting feature vector $x_t$ at the current timestamp based on convolutional neural networks (CNNs).

6. The method for enhancing target tracking via detector and tracker fusion for UAVs according to claim 5, wherein calculating the location and velocity estimation of the object at the current timestamp further including:

calculating the location and velocity estimation of the object at the current timestamp based on clock-work recurrent neural networks (CW-RNNs), and a probability sequence of estimations with equivalent factorizes as $P[(e_1, c_1), (e_2, c_2), \ldots, (e_t, c_t)] = \Pi_{q=1}^{t} p(e_q | e_q, c_q)$, where $e_t$ denotes the location and velocity estimation of the object at the current timestamp t.

7. The method for enhancing target tracking via detector and tracker fusion for UAVs according to claim 6, further including:

at the current timestamp t, calculating an output $o_t$ of a single CW-RNN unit by $o_t = f_o(W_{out} s_t)$ and $s_t = f_s(W_H s_{t-1} + W_{in} a_t)$, where $a_t$ denotes an input to a hidden layer of the clock-work recurrent neural networks, as well as an output of a previous layer's output, and $s_{t-1}$ denotes an output of hidden parts at the timestamp (t−1), $f_s$ denotes an active function of hidden layer, $W_H$ denotes a hidden processors interconnected matrix; $W_{in}$ denotes a weight matrix from input neurons to hidden processors, and $W_{out}$ denotes a weight matrix from the hidden processors to the output neurons, $W_H$ is a block-upper triangular matrix where each entry $W_{j,i}$, i, j∈[1, . . . , g] is a connection weight matrix from $T_i$ to $T_j$ or 0s if $T_i < T_j$, wherein the output $o_t$ is a vector ($slx_t$, $sly_t$, $srx_t$, $sry_t$, $svx_t$, $svy_t$), where each entry is a real number between 0 to 1.

8. The method for enhancing target tracking via detector and tracker fusion for UAVs according to claim 7, further including:

calculating the location and velocity estimation $e_t$ of the object at the current timestamp t by $e_t = (slx_t \times w_{frame}, sly_t \times h_{frame}, srx_t \times w_{frame}, sry_t \times h_{frame}, svx_t \times w_{frame}, svy_t \times h_{frame})$.

9. A non-transitory computer-readable medium having computer program for, when being executed by a processor, performing a method for enhancing target tracking via detector and tracker fusion for Unmanned Aerial Vehicles (UAVs), the method comprising:

receiving at least one raw input image of objects to be detected;

based on the at least one raw input image of objects, generating the objects' candidate information;

based on the objects' candidate information, calculating location and velocity estimation of an object at a current timestamp based on a detector and tracker fusion, comprising:

generating a binary feature canvas;

processing the binary feature canvas based on an attention mechanism to focus on relevant parts of the binary feature canvas;

extracting features of the objects from the processed binary feature canvas; and calculating the location and velocity estimation of the object at the current timestamp;

wherein processing the binary feature canvas based on the attention mechanism to focus on relevant parts of the binary feature canvas further including:

generating an attention mask $M_t(e_{t-1})$ and applying the attention mask $M_t(e_{t-1})$ to each channel of the feature canvas $c_t$, respectively; and obtaining a masked feature canvas, wherein the attention mask $M_t(e_{t-1})$ is generated by a mixture of N×N Gaussians, each Gaussian (i,j) has a center at $$\left(\frac{rx_{t-1} + lx_{t-1}}{2} + vx_{t-1} + \left(i - \frac{N}{2} - 0.5\right),\right.$$
$$\left.\frac{ry_{t-1} + ly_{t-1}}{2} + vy_{t-1} + \left(i - \frac{N}{2}\right)\right) \text{ and } \sigma = \frac{S_{frame}}{S_{Pt-1}},$$

where $S_{frame}$ denotes an area of the raw input image, and $S_{Pt-1}$ denotes an area of the object's estimated bounding box at a timestamp (t−1), and $m(c_t, e_{t-1}) = M_t(e_{t-1}) \cdot c_t$, where $m(c_t, e_{t-1})$ denotes the masked feature canvas; and based on the location and velocity estimation of the object at the current timestamp, predicting the location and velocity estimation of the object at a future timestamp.

10. The non-transitory computer-readable medium according to claim 9, wherein:

based on the at least one raw input image of objects, generating the objects' candidate information further including:

based on a pre-trained histogram-of-oriented-gradient (HOG) algorithm, generating a bounding box $bb^{(lx,ly,rx,ry)}$ corresponding to the object at the current timestamp, wherein the bounding box information includes location of left upper corner (lx,ly,) and location of bottom-right corner (rx,ry,), based on Kanade-Lucas-Tomasi (KLT) approach, generating the object's location information at each timestamp according to trackers feature points $P_{KLT} = \{p_1^{(x_1,y_1)}, p_2^{(x_2,y_2)} \ldots p_n^{(x_n,y_n)}\}$, and based on learnt discriminative correlation filters on scaled pyramid representations for both translation and scale estimation, generating a bounding box $bb_{corr}$.

11. The non-transitory computer-readable medium according to claim 10, wherein:
the binary feature canvas is denoted by $c_t$, $c_t$ represents vision information in a feature space at a current timestamp t;
the binary feature canvas has a size (h, w) which is the same as a size of the raw input image; and
the binary feature canvas has three channels corresponding to information of $\{bb, P_{KLT}, bb_{corr}\}$ with binary values using the one-hot encoding,
wherein when the channel represents the bounding box (bb, $bb_{corr}$), then a pixel inside the bounding box is set to be 1 and a pixel outside the bounding box to be 0, and when the channel represents the trackers feature points ($P_{KLT}$), then positions of the trackers feature points on the binary feature canvas is set to be 1 and positions of the trackers feature points beyond the binary feature canvas to be 0.

12. The non-transitory computer-readable medium according to claim 11, wherein:
extracting features of the objects from the processed binary feature canvas further including extracting feature vector $x_t$ at the current timestamp based on convolutional neural networks (CNNs); and
calculating the location and velocity estimation of the object at the current timestamp further including calculating the location and velocity estimation of the object at the current timestamp based on clock-work recurrent neural networks (CW-RNNs), and a probability sequence of estimations with equivalent factorizes as $P[(e_1, c_1), (e_2, c_2), \ldots, (e_t, c_t)] = \Pi_{q=1}^{t} p(e_q | e_q, c_q)$, where $e_t$ denotes the location and velocity estimation of the object at the current timestamp t.

13. The non-transitory computer-readable medium according to claim 12, further including:
at the current timestamp t, calculating an output $o_t$ of a single CW-RNN unit by $o_t = f_o(W_{out} s_t)$ and $s_t = f_s(W_H s_{t-1} + W_{in} a_t)$, where $a_t$ denotes an input to a hidden layer of the clock-work recurrent neural networks, as well as an output of a previous layer's output, $a_t$ equals to the $x_t$ at a first RNN layer, $s_{t-1}$ denotes an output of hidden parts at the timestamp (t−1), f, denotes an active function of hidden layer, $W_H$ denotes a hidden processors interconnected matrix; $W_{in}$ denotes a weight matrix from input neurons to hidden processors, and $W_{out}$ denotes a weight matrix from the hidden processors to the output neurons, $W_H$ is a block-upper triangular matrix where each entry $W_{j,i}$, i, j∈[1, . . . g] is a connection weight matrix from $T_i$ to $T_j$ or 0s if $T_i < T_j$, wherein the output $o_t$ is a vector ($slx_t$, $sly_t$, $srx_t$, $sry_t$, $svx_t$, $svy_t$), where each entry is a real number between 0 to 1; and
calculating the location and velocity estimation $e_t$ of the object at the current timestamp t by $e_t = (slx_t \times w_{frame}, sly_t \times h_{frame}, srx_t \times w_{frame}, sry_t \times h_{frame}, svx_t \times w_{frame}, svy_t \times h_{frame})$.

14. A system for enhancing target tracking via detector and tracker fusion, comprising:
a memory; and
a processor coupled to the memory, wherein the processor is configured to:
receive a raw input image of objects and generate the objects' candidate information; and
generate the objects' candidate information based on the at least one raw input image of objects, calculate location and velocity estimation of an object at a current timestamp based on a detector and tracker fusion based on the objects' candidate information, and predict the location and velocity estimation of the object at a future timestamp based on the location and velocity estimation of the object at the current timestamp, comprising:
generate a binary feature canvas;
process the binary feature canvas based on an attention mechanism to focus on relevant parts of the binary feature canvas;
extract features of the objects from the processed binary feature canvas; and
calculate the location and velocity estimation of the object at the current timestamp;
wherein process the binary feature canvas based on the attention mechanism to focus on relevant parts of the binary feature canvas further including:
generate an attention mask $M_t(e_{t-1})$ and applying the attention mask $M_t(e_{t-1})$ to each channel of the feature canvas $c_t$, respectively; and
obtain a masked feature canvas,
wherein the attention mask $M_t(e_{t-1})$ is generated by a mixture of N×N Gaussians, each Gaussian (i,j) has a center at $$\left(\frac{rx_{t-1} + l_{t-1}}{2} + vx_{t-1} + \left(i - \frac{N}{2} - 0.5\right),\right.$$
$$\left.\frac{ry_{t-1} + ly_{t-1}}{2} + vy_{t-1} + \left(i - \frac{N}{2}\right)\right) \text{ and } \sigma = \frac{S_{frame}}{S_{Pt-1}},$$

where $S_{frame}$ denotes an area of the raw input image, and $S_{P_{t-1}}$ denotes an area of the object's estimated bounding box at a timestamp (t−1), and $m(c_t, e_{t-1}) = M_t(e_{t-1}) \cdot c_t$, where $m(c_t, e_{t-1})$ denotes the masked feature canvas.

15. The system for enhancing target tracking via detector and tracker fusion according to claim 14, wherein the processor is further configured to:
based on a pre-trained histogram-of-oriented-gradient (HOG) algorithm, generate a bounding box $bb^{(lx,ly,rx,ry)}$ corresponding to the object at the current timestamp, wherein the bounding box information includes location of left upper corner (lx, ly,) and location of bottom-right corner (rx,ry,),
based on Kanade-Lucas-Tomasi (KLT) approach, generate the object's location information at each timestamp according to trackers feature points $P_{KLT} = \{p_1^{(x_1,y_1)}, p_2^{(x_2,y_2)} \ldots p_n^{(x_n,y_n)}\}$, and
based on learnt discriminative correlation filters on scaled pyramid representations for both translation and scale estimation, generate a bounding box $bb_{corr}$.

16. The system for enhancing target tracking via detector and tracker fusion according to claim 15, wherein:
the binary feature canvas is denoted by $c_t$, $c_t$ represents vision information in a feature space at a current timestamp t;
the binary feature canvas has a size (h, w) which is the same as a size of the raw image; and
the binary feature canvas has three channels corresponding to information of $\{bb, P_{KLT}, bb_{corr}\}$ with binary values using the one-hot encoding, wherein when the channel represents the bounding box (bb, $bb_{corr.}$), then a pixel inside the bounding box is set to be 1 and a pixel outside the bounding box to be 0, and when the channel represents the trackers feature points ($P_{KLT}$), then positions of the trackers feature points on the binary feature canvas is set to be 1 and positions of the trackers feature points beyond the binary feature canvas to be 0.

17. The system for enhancing target tracking via detector and tracker fusion according to claim 16, wherein the processor is further configured to:
 extract a feature vector $x_t$ at the current timestamp based on convolutional neural networks (CNNs); and
 calculate the location and velocity estimation of the object at the current timestamp based on clock-work recurrent neural networks (CW-RNNs), and a probability sequence of estimations with equivalent factorizes as $P[(e_1, c_1), (e_2, c_2), \ldots, (e_t, c_t)] = \Pi_{q=1}^{t} p(e_q | e_q, c_q)$, where $e_t$ denotes the location and velocity estimation of the object at the current timestamp t.

18. The system for enhancing target tracking via detector and tracker fusion according to claim 17, wherein the processor is further configured to:
 at the current timestamp t, calculate an output $o_t$ of a single CW-RNN unit by $o_t = f_o(W_{out} s_t)$ and $s_t = f_s(W_H s_{t-1} + W_{in} a_t)$, where $a_t$ denotes an input to a hidden layer of the clock-work recurrent neural networks, as well as an output of a previous layer's output, $a_t$ equals to the $x_t$ at a first RNN layer, $s_{t-1}$ denotes an output of hidden parts at the timestamp (t−1), $f_s$ denotes an active function of hidden layer, $W_H$ denotes a hidden processors interconnected matrix; $W_{in}$ denotes a weight matrix from input neurons to hidden processors, and $W_{out}$ denotes a weight matrix from the hidden processors to the output neurons, $W_H$ is a block-upper triangular matrix where each entry $W_{j,i}$, i, j∈[1, ..., g] is a connection weight matrix from $T_i$ to $T_j$ or 0s if $T_i < T_j$, wherein the output $o_t$ is a vector ($slx_t$, $sly_t$, $srx_t$, $sry_t$, $svx_t$, $svy_t$), where each entry is a real number between 0 to 1;
 calculate the location and velocity estimation $e_t$ of the object at the current timestamp t by $e_t = (slx_t \times w_{frame}, sly_t \times h_{frame}, srx_t \times w_{frame}, sry_t \times h_{frame}, svx_t \times w_{frame}, svy_t \times h_{frame})$; and
 predict the location and velocity estimation of the object at a future timestamp.

\* \* \* \* \*